(12) United States Patent
Fabbris et al.

(10) Patent No.: US 8,685,158 B2
(45) Date of Patent: Apr. 1, 2014

(54) WATER RETENTION AGENT FOR CEMENTITIOUS COMPOSITIONS AND CEMENTITIOUS COMPOSITIONS CONTAINING SAME

(71) Applicants: C.T.G. (Centre Technique du Groupe Italcementi), Guerville (FR); Ciments Francais, Puteaux (FR)

(72) Inventors: Faber Fabbris, Paris (FR); Bénigne Bollotte, Guerville (FR)

(73) Assignee: Ciments Francais, Puteaux (FR)

( * ) Notice: Subject to any disclaimer, the term of this patent is extended or adjusted under 35 U.S.C. 154(b) by 0 days.

(21) Appl. No.: 13/684,977

(22) Filed: Nov. 26, 2012

(65) Prior Publication Data
US 2013/0081558 A1    Apr. 4, 2013

Related U.S. Application Data

(63) Continuation of application No. 13/634,625, filed as application No. PCT/FR2011/050405 on Feb. 28, 2011, now abandoned.

(30) Foreign Application Priority Data

Mar. 15, 2010 (FR) ................................. 10 51814

(51) Int. Cl.
| | |
|---|---|
| C04B 16/02 | (2006.01) |
| C11D 7/60 | (2006.01) |
| C09D 1/00 | (2006.01) |
| C09D 4/00 | (2006.01) |
| C09D 5/00 | (2006.01) |
| C09D 11/00 | (2006.01) |
| C09K 3/00 | (2006.01) |
| C08L 1/00 | (2006.01) |
| C08L 3/00 | (2006.01) |
| C08L 5/00 | (2006.01) |
| C09D 101/00 | (2006.01) |
| C09D 103/00 | (2006.01) |
| C09D 105/00 | (2006.01) |
| C09J 101/00 | (2006.01) |
| C09J 103/00 | (2006.01) |
| C09J 105/00 | (2006.01) |
| C04B 24/10 | (2006.01) |
| C04B 16/00 | (2006.01) |
| C04B 24/00 | (2006.01) |
| C04B 28/10 | (2006.01) |

(52) U.S. Cl.
USPC .................. 106/804; 106/162.1; 106/163.01; 106/5; 106/31.94; 106/617; 106/720

(58) Field of Classification Search
USPC ........... 106/162.1, 163.01, 5, 31.94, 617, 720
See application file for complete search history.

(56) References Cited

U.S. PATENT DOCUMENTS

| | | | |
|---|---|---|---|
| 4,283,229 A | 8/1981 | Girg et al. | |
| 4,845,152 A * | 7/1989 | Palmer | 524/734 |
| 5,028,263 A | 7/1991 | Burdick | |
| 6,712,897 B2 * | 3/2004 | Ayambem et al. | 106/189.1 |
| 2005/0246993 A1 * | 11/2005 | Colbert et al. | 52/459 |

FOREIGN PATENT DOCUMENTS

| | | |
|---|---|---|
| EP | 1 614 669 | 1/2006 |
| EP | 1742894 A1 * | 1/2007 |
| WO | 02094734 | 11/2002 |

OTHER PUBLICATIONS

Patural, L.; Govin, A.; Ruot B.; Deves, O.; Grosseau, P. "Influence of cellulose ether particle size on water retention of freshly mixed mortars". Intenernational Conference on Superplasticizers and other Chemical Admixtures in Concrete. Oct. 16, 2009 . Retrieved from http://hal-cstb.archives-ouvertes.fr/docs/00/44/83/69/PDF/LP-CANMET09.pdf.*

Attapulgite Technical Data Sheet. Attagel 30. Retrieved from http://www.google.com/url?sa=t&rct=j&q=&esrc=s&frm=1&source=web&cd=1&ved=0CDEQFjAA&url=http%3A%2F%2Fwww.centasiathai.com%2Fen%2Fproduct%2Fattagel-30%2Fdownload%2Ftd_attagel-30.pdf&ei=iAqVUe7hDs-90QGYhICoAg&usg=AFQjCNEqzgLBUxlzhoW3gx33ga-TatzHjQ&sig2=nzFPGnl3zeWzmSyAaERu7g&bym=bv.46471029.*

Silicon Dioxide Safety Data Sheet. Orica Chemicals. Retrieved from http://msds.orica.com/pdf/shess-en-cds-010-000033135601.pdf.*

International Search Report dated May 12, 2011, corresponding to PCT/FR2011/050405.

* cited by examiner

*Primary Examiner* — Kaj K Olsen
*Assistant Examiner* — Karam Hijji
(74) *Attorney, Agent, or Firm* — Young & Thompson

(57) ABSTRACT

A water retention agent for a cementitious composition, characterized in that it takes the form of a liquid aqueous suspension of at least one polysaccharide at a mass concentration of between 15 and 30% in an aqueous solution of a strong base salt, excluding ammonium salts, with an anionic strength of between 1.25 mol/L and 15 mol/L, having a pH greater than 9 and containing an attapulgite in micronized form and at least one non-phyllitic mineral powder, referred to hereafter as filler, which is chemically inert in the aqueous suspension and which has a grain size of between 0.1 and 100 micrometers, the aqueous suspension being stable at least in a temperature range of between 5° C. and 30° C. The water retention agent is suitable for increasing both the viscosity and the water retention capacity of cementitious compositions without affecting the spreading ability thereof.

17 Claims, No Drawings

WATER RETENTION AGENT FOR CEMENTITIOUS COMPOSITIONS AND CEMENTITIOUS COMPOSITIONS CONTAINING SAME

The present invention relates to the field of water retention agents for cementitious compositions and to the cementitious compositions comprising them.

Cementitious compositions are generally composed of cement, water and one or more adjuvants, depending on the properties desired for these compositions. Mortars and concretes additionally include inert components, such as sand or aggregates of larger size.

As their name indicates, the aim of the adjuvants known as water retention agents is to keep the water within these cementitious compositions.

This is because, when this composition, itself or in the form of mortar or concrete, is brought into contact with a porous absorbent support (such as bricks made of terracotta, clayey soils, and the like), the water present in said cementitious composition has a tendency to migrate by capillary action toward said support, thus reducing the water content of said cementitious composition. A symmetrical situation, namely an excessive enriching in water, can occur when the cementitious composition is in contact with a source of water (for example, concrete in in-depth mixtures for foundation piles).

The term "water retention agent" is thus understood to mean an agent which keeps the water content of the cementitious composition within appropriate limits, without depleting or enriching the water content.

In all these cases, the properties of the cementitious composition are altered in an undesirable way (risks of cracking or laitance for mortars, detrimental local changes in the Water/Cement ratio for concrete, and the like).

The adjuvants having a water retention function frequently employed are generally polysaccharides, such as cellulose ethers, for example methylcellulose, carboxymethylcellulose, hydroxyethylcellulose or also ethylhydroxyethylcellulose.

These adjuvants are always introduced into the cement grout in the powder form, before or during mixing with water.

On site, it is difficult to accurately measure out such powders. In addition, the problem is posed of the homogenization thereof in the cementitious compositions, whether they are added before, during or after the mixing with the water.

One aim of the invention is thus to provide a water retention adjuvant in another form than in the pulverulent form, namely in a liquid form.

Research has thus been carried out on introducing such polysaccharides in the liquid form.

While polysaccharides are soluble in water at low concentration, their solubility is incomplete when it is desired to increase their concentration beyond 5% by weight, for example, and very often compositions of very high viscosity, indeed even pasty compositions or gels, are obtained which it is subsequently very difficult to use: decanting and pumping then being very difficult or impossible.

If, on the other hand, the polysaccharides are dispersed in a liquid medium in which they are not soluble, they bring about liquid suspensions which are generally unstable because of the difference in density between the particles and the liquid medium. These suspensions can exhibit, over time, separation by settling or a creaming phenomenon, resulting in a deposit on the walls of the container in which they are present. In some cases, these suspensions exhibit one of the two phenomena as a result of a variation in temperature. In other cases, they can exhibit one or other of the two phenomena (separation by settling or creaming) according to the temperature to which they are exposed.

Furthermore, the U.S. Pat. No. 5,028,263 from Aqualon describes aqueous suspensions of anionic or nonionic polymers, such as cellulose ethers, dispersed in aqueous solutions having a high content of ammonium salt. However, such salts are not compatible with use in a cementitious medium as they react with $Ca(OH)_2$ and accelerate the degradation of the concrete.

U.S. Pat. No. 4,283,229 describes cellulose ether suspensions including very finely divided alumina. However, very finely divided alumina accelerates the setting times of the cement, which can be damaging, for example, to the preparation of self-leveling screeds, for which it is necessary to maintain the rheology over time.

Furthermore, none of these documents refers to stability at the temperature of the aqueous suspensions employed.

An aim of the present invention is to overcome the above disadvantages by providing a water retention agent in the form of a liquid aqueous suspension of polysaccharide which can be used in cementitious compositions.

This is because it has been discovered, surprisingly, that the suspending of polysaccharide in an aqueous solution of a specific ionic strength in the presence of a clay of attapulgite type and of a micronized mineral powder makes it possible to stabilize said polysaccharide suspension at least within a certain temperature range.

To this end, the water retention agent for a cementitious composition according to the invention is characterized in that it is provided in the form of a liquid aqueous suspension of at least one polysaccharide at a concentration by weight of between 15 and 30% in an aqueous solution of a strong base salt, with the exception of ammonium salts, with an ionic strength of between 1.25 mol/l and 15 mol/l, exhibiting a pH of greater than 9 and including an attapulgite in the micronized form and at least one nonphyllitic mineral powder, hereinafter referred to as filler, chemically inert in said aqueous suspension, with a particle size of between 0.1 and 100 micrometers, conferring, on said aqueous suspension, stability at least within a temperature range extending from 5° C. to 30° C.

Thus, a high concentration by weight of polysaccharide allows this aqueous suspension to be used in numerous situations and makes it possible to introduce a high proportion of polysaccharide without increasing the content of adjuvant (which must not exceed 5% of the weight of the cement). In addition, this stability over a temperature range extending from at least 5° C. to 30° C. allows them to be stored, transported and employed in cementitious compositions in the majority of uses, in particular on sites.

The content by weight of attapulgite in the aqueous suspension is advantageously between 0.1% and 5%, preferably between 0.2% and 0.8%.

Among the clays tested, attapulgite (or polygorskite) is a phyllosilicate which makes it possible, surprisingly, to stabilize the polysaccharide suspension according to the invention with regard to variations in temperature (in particular between 5 and 30° C.).

The comparative examples described below in the description show that other clays, such as bentonite or kaolinite, at the same concentrations, are not at all effective.

Advantageously, the filler is a siliceous filler, preferably a crystalline siliceous filler, with a density of between 2.60 and 2.80 g/ml. It can, for example, be micronized silica.

Preferably, this filler exhibits a particle size curve for which the D50 value is between 1 and 12 micrometers, preferably between 2 and 8 micrometers.

Its content by weight is advantageously between 0.1 and 5%, preferably between 0.35 and 1.5%, of said aqueous suspension.

The preferred concentration by weight of polysaccharide(s) is between 18 and 25% of said aqueous suspension.

The aqueous suspension is produced by the preparation first of all of the aqueous solution with an ionic strength of between 1.25 mol/l and 15 mol/l, preferably between 2.5 mol/l and 12.5 mol/l and advantageously between 5 and 10 mol/l.

The strong base salt used to prepare this aqueous solution can, for example, be $K_2CO_3$, $K_3PO_4$, $Na_2CO_3$, or $NaH_2PO_4$. The presence of halides and also of sulfates, if it is desired to employ said suspension in the cement field, is also avoided in this solution.

The polysaccharide is provided in the form of a dry powder and its dry particle size curve exhibits a D50 value of between 10 and 200 μm, preferably between 50 and 150 μm.

Advantageously, the polysaccharide is chosen from a hydroxyalkylcellulose or a hydroxyalkyl guar comprising a $C_2$ to $C_8$ alkyl group, or a mixture of these.

The hydroxyalkylcellulose can be chosen from a hydroxyethylcellulose (HEC), a methylhydroxypropyl-cellulose (MHPC), a hydrophobic modified hydroxyethylcellulose (HMHEC), or a mixture of these.

In the cement field, it has turned out that the water retention agent in the form of an aqueous suspension, as described above, can be used in cementitious compositions for increasing both their viscosity and their ability to retain water within them, indeed even without affecting the spreading thereof. This is because it has been found, surprisingly, that, in the case in particular where the polysaccharide used is a hydroxyalkylcellulose, it does not reduce the spreading of these cementitious compositions in which it is incorporated.

Thus, the present invention also relates to a cementitious composition based on cement and water, characterized in that it includes, as water retention agent, a liquid aqueous suspension as mentioned above in a content of between 0.1 and 5% approximately by weight of cement, preferably between 0.1 and 2% by weight of cement.

The present invention will be illustrated using the following nonlimiting examples:

EXAMPLES

Example 1—Comparative

An aqueous potassium carbonate ($K_2CO_3$) solution is prepared according to a concentration by weight of 32 g of $K_2CO_3$ in 100 g of water. The ionic strength of this solution is approximately 7 mol/l.

If a polysaccharide, such as hydroxyethylcellulose, is introduced into this solution, according to fractions by weight of between 18 and 22% by weight, it is found that the particles do not dissolve and that this suspension exhibits a phase separation in the form of a creaming visible after storing for 12 h. This creaming corresponds to approximately $1/10^{th}$ of the height of the suspension.

The density of the solution is in this case 1.2296 g/ml at 20° C. In order to avoid this tendency toward the phenomenon of creaming, it may be possible either to reduce the density of the aqueous phase ($K_2CO_3$ solution) or to increase the density of the suspension (HEC particles).

The first solution is difficult to carry out; it has therefore been envisaged to influence the density of the suspended particles by charging them with a solid substance which may, for example, remain integral with the suspended hydrated hydroxyethylcellulose particles.

It turns out that, in the present case, the dry HEC particles exhibit a D50 of 85 micrometers. Siliceous fillers have been envisaged in view of their chemical stability with regard to the $K_2CO_3$ solution. Various fillers having different particle sizes have been tested, these siliceous fillers exhibiting a density of between 2.6 and 2.7. These fillers are presented in table 1 below.

TABLE 1

| Particle size of the fillers selected | | | | |
|---|---|---|---|---|
| | >5 μm | D50 | D10 | D90 |
| Siliceous filler A | 77% | 11 μm | 32 μm | 3 μm |
| Siliceous filler B | 57.4% | 5.8 μm | 13.7 μm | 2.21 μm |
| Siliceous filler C | 33.8% | 3.6 μm | 9.9 μm | 1.54 μm |
| Siliceous filler D | 13.7% | 2.4 μm | 5.7 μm | 1.0 μm |

The effects of these various fillers on the reference suspension are presented in table 2 below.

The fillers were added with stirring to the $K_2CO_3$ solution before the addition of the hydroxyethylcellulose polysaccharide. After standing for 12 hours, it is observed (see table 2) that the suspensions including the fillers B, C and D exhibit a low creaming, the fraction of which of the height is less than $1/20$, lower than the reference suspension and the suspension with the filler A.

The filler B was thus selected for the continuation, it being considered that fillers with a finer particle size and thus a higher level of grinding (that is to say having a higher cost) do not exhibit significant advantages.

The apparatus having the Turbiscan® name was employed for these samples and for the tests on the examples below. The Turbiscan® is a device, the operation of which is based on the scattering of light. A laser beam surrounds a sample inside a test tube. Depending on the size, the concentration and the surface condition of the particles, a fraction of the light is transmitted in the same direction of incidence and a fraction is back-scattered in different directions. Two sensors measure the intensity of the transmitted signal (angle of deflection 0°) and of the back-scattered signal (angle of deflection equal to 135°). The light source travels over the entire height of the sample, thus demonstrating the possible differences in composition and in particular a separation of phases (sudden variations in the signals of light transmitted or back-scattered as a function of the height). The fractions of intensity transmitted or back-scattered can then be represented as a function of the height of the sample. The heights of each of the phases are deduced from these graphs, making it possible to quantify the separation of phases.

In the examples below, the stability at 12 h expresses the rounded value and the Turbiscan® 12 hours measurement expresses the more accurate value in % of the fraction of the height of the separated phase: a positive fraction represents a creaming phenomenon and a negative fraction represents a phenomenon of separation on settling.

TABLE 2

Comparison of the effect of various fillers on the reference formulation

|  | Without filler | Filler A | Filler B | Filler C | Filler D |
|---|---|---|---|---|---|
| $K_2CO_3$ | 32 g | 32 g | 32 g | 32 g | 32 g |
| Water | 100 g | 100 g | 100 g | 100 g | 100 g |
| HEC | 37.22 g | 37.22 g | 37.22 g | 37.22 g | 37.22 g |
| Stabilizing filler | — | 1.7 g | 1.7 g | 1.7 g | 1.7 g |
| Conc. Saline Sol. | 32 g/ 100 ml | 32 g/ 100 ml | 32 g/ 100 ml | 32 g/ 100 ml | 32 g/ 100 ml |
| Frac. Weight HEC | 22% | 22% | 22% | 22% | 22% |
| $\rho_{sol}$ at 20° C. | 1.2296 g/ml | 1.2296 g/ml | 1.2296 g/ml | 1.2296 g/ml | 1.2296 g/ml |
| Stability at 12 h Height fraction | Creaming <1/10 | Creaming <1/10 | Creaming <1/20 | Creaming <1/20 | Creaming <1/20 |
| Turbiscan 12 h measurement | 7.82% | 6.96% | 3.12% | 3.22% | 3.05% |

Example 2—Comparative

In order to confirm if the variation in a dosage of filler makes it possible to sufficiently ballast the hydrated hydroxyethylcellulose particles, different concentrations were tested. They were between 1 and 2% by weight. The results are presented in table 3 below.

TABLE 3

Variation in the dosage of filler B (1%-2%)

|  | Without filler | 1% | 1.2% | 1.4% | 1.6% | 1.8% | 2% |
|---|---|---|---|---|---|---|---|
| $K_2CO_3$ | 32 g | 32 g | 32 g | 32 g | 32 g | 32 g | 32 g |
| Water | 100 g | 100 g | 100 g | 100 g | 100 g | 100 g | 100 g |
| HEC | 37.22 g | 37.22 g | 37.22 g | 37.22 g | 37.22 g | 37.22 g | 37.22 g |
| Stabilizing filler | — | 1.70 g | 2.059 g | 2.405 g | 2.75 g | 3.097 g | 3.46 g |
| Conc. Saline Sol. | 32 g/ 100 ml | 32 g/ 100 ml | 32 g/ 100 ml | 32 g/ 100 ml | 32 g/ 100 ml | 32 g/ 100 ml | 32 g/ 100 ml |
| Frac. Weight HEC | 22% | 22% | 22% | 22% | 22% | 22% | 22% |
| $\rho_{sol}$ at 20° C. | 1.2296 g/ml | 1.2296 g/ml | 1.2296 g/ml | 1.2296 g/ml | 1.2296 g/ml | 1.2296 g/ml | 1.2296 g/ml |
| Turbiscan 12 h measurement | 7.82% | 3.12% | <0.1% | <0.1% | −1.7% sos. | −2.69% sos. | −3.5% sos. | sos. = separation on settling

It is noted that the concentrations of 1.2% and 1.4% exhibit, after 12 hours, a limited creaming phenomenon. Above, the concentrations of filler of greater than or equal to 1.6% favor separation on settling.

The temperature stability of the suspension comprising 1.2% by weight of filler was tested between 5 and 35° C. (see table 4). The protocol used to monitor this temperature stability is as follows:

An amount of approximately 500 ml of suspension is prepared and then divided into six samples which are exposed to different temperatures (respectively 5, 10, 15, 20, 25 and 35° C.) for 12 hours. These samples are subsequently subjected to a measurement of fraction of the light according to the Turbiscan® method (described in example 1 above).

After having brought the samples back to a temperature of 20° C., the stability measurements are repeated. Finally, the samples are subjected to stirring and are again subjected to a measurement at 20° C. in order to detect possible irreversibility in the transformations which have occurred with the temperature.

After returning to 20° C., the samples with filler exposed beforehand to 5 and 10° C. exhibit significant creaming. For the sample at 25° C., an intermediate phase separation is observed. It is thus found that these aqueous suspensions of hydroxyethylcellulose with filler are not stable as a function of the temperature, which may present disadvantages, in particular during the storage thereof.

TABLE 4

Temperature stability of the reference formulation with filler (1.2%)

|  | 5° C. | 10° C. | 15° C. | 20° C. | 25° C. | 35° C. |
|---|---|---|---|---|---|---|
| After 12 h | −1% (sos.) | <0.1% | −5.5% (sos.) | <0.1% | <0.1%* | <0.1% |
| After returning to 20° C. | 4.44% | 2% | <0.1% | — | <0.1%* | <0.1% |

*intermediate phase separation

Example 3

0.5% by weight of attapulgite (sold under the name Attagel 50—particles with a size of 0.1 μm and a density of 2.4) was thus introduced in the dry form into the reference formulation including 1.2% by weight of filler B. The composition of the suspension is presented in table 5.

The temperature-stability tests were carried out and it turns out that these are entirely satisfactory, as can be seen in table 6.

The stability of these suspensions is markedly improved by virtue of the presence of this filler and of attapulgite.

TABLE 5

Reference formulation with filler (1.2%) and attapulgite (0.5%)

| Component | Weight, g (%) |
|---|---|
| $K_2CO_3$ | 32 g |
| Water | 100 g |
| Hydroxyethylcellulose | 37.23 g (22%) |
| Filler B | 2.059 g (1.2%) |
| Attapulgite | 0.865 g (0.5%) |
| Stability at 12 h | <0.1% |

TABLE 6

Temperature stability of the reference formulation with 1.2% filler and 0.5% attapulgite

| | 5° C. | 10° C. | 15° C. | 20° C. | 25° C. | 35° C. |
|---|---|---|---|---|---|---|
| Standing for 12 h | <0.1% | <0.1% | <0.1% | <0.1% | −0.5% | −1.2% |
| After returning to 20° C. | <0.1% | <0.1% | <0.1% | — | −0.2% | −0.9% |

Example 4

Different concentrations of attapulgite were tested. These concentrations are presented in table 7 below.

TABLE 7

Reference formulation with filler (1.2%) and attapulgite in variable amounts

| Component | Weight (g) | | | | |
|---|---|---|---|---|---|
| $K_2CO_3$ | 32 g | 32 g | 32 g | 32 g | 32 g |
| Water | 100 g | 100 g | 100 g | 100 g | 100 g |
| Hydroxyethylcellulose (22%) | 37.23 g | 37.23 g | 37.23 g | 37.23 g | 37.23 g |
| Filler B (1.2%) | 2.059 g | 2.059 g | 2.059 g | 2.059 g | 2.059 g |
| Attapulgite | — | 0.173 g | 0.346 g | 0.865 g | 1.384 g |
| % by weight | 0% | 0.1% | 0.2% | 0.5% | 0.8% |

The temperature stabilities of these different suspensions were tested and they are presented in table 8 below.

TABLE 8

Temperature stability of the reference formulation with 1.2% filler and variable attapulgite

| | 5° C. | 10° C. | 15° C. | 20° C. | 25° C. | 35° C. |
|---|---|---|---|---|---|---|
| *Without attapulgite* | | | | | | |
| Standing for 12 h | −1.00% | <0.1% | −5.50% | <0.1% | <0.1% | <0.1% |
| After returning to 20° C. | 4.44% | 2.00% | 0.10% | — | 0.10% | 0.10% |
| *0.1% attapulgite* | | | | | | |
| Standing for 12 h | −1.00% | <0.1% | −1.83% | <0.1% | <0.1% | <0.1% |
| After returning to 20° C. | 2.82% | 1.83% | −2.65% | — | <0.1% | 0.10% |
| *0.2% attapulgite* | | | | | | |
| Standing for 12 h | −1.00% | <0.1% | 0.2% | <0.1% | <0.1% | <0.1% |
| After returning to 20° C. | −1.3% | 0.2% | 0.32% | — | <0.1% | 0.10% |
| *0.5% attapulgite* | | | | | | |
| Standing for 12 h | <0.1% | <0.1% | <0.1% | <0.1% | −0.5% | −1.2% |
| After returning to 20° C. | <0.1% | <0.1% | <0.1% | — | −0.2% | −0.9% |
| *0.8% attapulgite* | | | | | | |
| Standing for 12 h | 0.91% | 0.25% | <0.1% | <0.1% | −0.7% | −1.3% |
| After returning to 20° C. | 0.65% | <0.1% | <0.1% | — | −0.25% | −0.7% |

The temperature-stability results are markedly improved in the presence of attapulgite and more particularly starting from a content by weight of attapulgite in the aqueous suspension of 0.2%.

Example 5—Comparative

Under the same operating conditions, if a concentration of attapulgite of 0.5% is maintained and if the filler is omitted, the stability results are very mediocre. At 24 hours, significant creaming is found, representing 6% of the height of the sample (see table 9).

This confirms that the combination of filler and of attapulgite is essential; the combined presence of attapulgite and of filler confers a synergy in the temperature stability of the aqueous polysaccharide suspension.

TABLE 9

Reference formulation with attapulgite and without filler

| Component | Weight, g (%) |
|---|---|
| $K_2CO_3$ | 32 g |
| Water | 100 g |
| Hydroxyethylcellulose | 37.23 g (22%) |
| Filler B | — |
| Attapulgite | 0.865 g (0.5%) |
| Stability at 24 h | 6% |

Example 6

Tests with Different Polysaccharides

Different polysaccharides were tested, all at concentrations by weight of 22% in the aqueous suspension. They are:

Hydroxyethylcellulose (HEC): cellulose derivative (cellulose ether) prepared from a modified natural polysaccharide, the main chain of which is cellulose (β-D-glucose), etherified using a strong base and ethylene oxide, in order to obtain hydroxyethylcellulose with a number of moles of substituent (MS) per β-D-glucose unit of 2.5 (sold under the name Natrosol GXR, exhibiting a degree of polymerization of approximately 1000).

Hydroxyethylcellulose having a high degree of polymerization HEC (HDP) (sold under the name Natrosol 250 HHXR): it is the same molecule as the hydroxyethylcellulose described above with a greater degree of polymerization of between 30,000 and 100,000 approximately.

Methylhydroxypropylcellulose (MHPC): this cellulose derivative exhibits two types of substituents at the OH groups of the cellulose, namely methoxyl (—O—$CH_3$) groups and hydroxypropyl (—O—$CH_2$—CH(OH)—$CH_3$) groups. The degree of substitution of the methoxyls is between 1.17 and 2.33 and the degree of substitution of the hydroxypropyls is between 0.05 and 0.8. The degree of polymerization of the cellulose unit is between 220 and 300, which confers, on the molecule, an average molar mass of between 40,000 and 50,000. This polysaccharide is sold under the name Culminal MHPC 500-PF.

Hydrophobic modified hydroxyethylcellulose (HMHEC): this cellulose derivative exhibits two types of substituents at the OH groups of the glucose molecule, namely hydroxyethyls (—O—$CH_2$—$CH_2$—OH) and alkyl groups with a number of carbons of between 8 and 25, and is sold under the name Nexton D2500W. The number of moles of substituents per β-D-glucoside unit is approximately 2.5.

Hydroxypropyl guar (HPG): this polysaccharide exhibits a main chain composed of a sequence of mannose (β-(1→4)-D-mannopyranose) residues with a (1→6) side group composed of a galactose residue (with a mannose/galactose ratio of between 1.5 and 2); hydroxypropyl groups (introduced by etherification) are present in place of some —OH groups of the natural molecule. The molecule is sold by Lamberti under the name Esacol HS30.

These polysaccharides were all tested under identical conditions, namely at 22% by weight in the aqueous suspension in the presence of 0.4% or 1.2% filler and 0.5% attapulgite (see table 10). All the suspensions including these polysaccharides exhibited advantageous performances with regard to the temperature stability (see the results combined in table 11).

TABLE 10

| Component | Weight (g)(%) | | | | |
|---|---|---|---|---|---|
| $K_2CO_3$ | 32 | 32 | 32 | 32 | 32 |
| Water | 100 | 100 | 100 | 100 | 100 |
| Polysaccharide | HEC 37.23 (22%) | HEC (HDP) 37.23 (22%) | MHPC 37.23 (22%) | HMHEC 37.23 (22%) | HPG 37.23 (22%) |
| Filler B | 0.686 (0.4%) | 2.059 (1.2%) | 0.686 (0.4%) | 0.686 (0.4%) | 0.686 (0.4%) |
| Attapulgite | 0.865 (0.5%) | 0.865 (0.5%) | 0.865 (0.5%) | 0.865 (0.5%) | 0.865 (0.5%) |
| Stability at 12 h | <0.1% | <0.05% | <0.1% | <0.1% | 2.08% |

Key:
HEC = hydroxyethylcellulose (Natrosol 250 GXR)
HEC (HDP) = hydroxyethylcellulose having a high degree of polymerization (Natrosol 250 HHXR)
MHPC = methylhydroxypropylcellulose (Culminal MHPC 500-PF)
HMHEC = hydrophobic modified hydroxyethylcellulose (Nexton D2500W)
HPG = hydroxypropyl guar (Esacol HS30)

TABLE 11

Temperature stability of the suspensions of the different polysaccharides of table 10

| | | 5° C. | 10° C. | 15° C. | 20° C. | 25° C. | 35° C. |
|---|---|---|---|---|---|---|---|
| HEC (HDP) | Standing for 12 h | <0.1% | <0.1% | <0.1% | <0.1% | <0.1% | −0.13% |
| | After returning to 20° C. | <0.1% | <0.1% | <0.1% | — | <0.1% | −0.2% |
| MHPC | Standing for 12 h | <0.1% | <0.1% | <0.1% | <0.1% | <0.1% | <0.1% |
| | After returning to 20° C. | <0.1% | <0.1% | <0.1% | — | <0.1% | <0.1% |
| HMHEC | Standing for 12 h | <0.1% | <0.1% | <0.1% | <0.1% | <0.1% | <0.1% |
| | After returning to 20° C. | <0.1% | <0.1% | <0.1% | — | <0.1% | <0.1% |
| HPG | Standing for 12 h | <0.1% | <0.1% | <0.1% | <0.1% | 3.59% | — |
| | After returning to 20° C. | 4.35% | 3.38% | 1.96% | — | 2.40% | — |

By way of comparison, other polysaccharides were tested which comprise acyl groups on the glucoside chains, such as, for example, gellan gum (nondeacylated) or carboxymethylcellulose (CMC). Mixtures of these polysaccharides with the aqueous $K_2CO_3$ solution are impossible, the flocs developing very rapidly and resulting in a pasty mixture which is virtually solid.

Similar observations were made with xanthan gum, which also has acyl groups.

Example 7—Comparative

Bentonite was tested as a replacement for attapulgite.

If a comparison is made with the result obtained in example 3 under the same conditions, bentonite does not make possible stability at 24 hours: a significant phenomenon of creaming is observed and all the samples exhibit a phase separation having a negative value, that is to say a separation by settling during the temperature stability tests (see table 13).

TABLE 12

Reference formulation with filler (1.2%) and bentonite (0.5%)

| Component | Weight, g (% by weight) |
|---|---|
| $K_2CO_3$ | 32 g |
| Water | 100 g |
| Hydroxyethylcellulose | 37.23 g (22%) |
| Filler B | 2.059 g (1.2%) |
| Bentonite | 0.865 g (0.5%) |
| Stability at 24 h | 9% |

TABLE 13

Temperature stability of the reference formulation with 1.2% filler and 0.5% bentonite

| | 5° C. | 10° C. | 15° C. | 20° C. | 25° C. | 35° C. |
|---|---|---|---|---|---|---|
| Standing for 12 h | <0.1% | −3.87% | −7.84% | −9% | — | −14.1% |
| After returning to 20° C. | −2.3% | −9.6% | −13.3% | — | — | −14.2% |

Example 8—Comparative

The tests with another clay, kaolinite, show an identical behavior to that observed with bentonite, with a worsening. The suspensions are very unstable and separation by settling is noted at 24 hours and also during the various tests at different temperatures (see table 15).

TABLE 14

Reference formulation with filler (1.2%) and kaolinite (0.5%)

| Component | Weight, g (% by weight) |
|---|---|
| $K_2CO_3$ | 32 g |
| Water | 100 g |
| Hydroxyethylcellulose | 37.23 g (22%) |
| Filler B | 2.059 g (1.2%) |
| Kaolinite | 0.865 g (0.5%) |
| Stability at 24 h | −19.08% |

TABLE 15

Temperature stability of the reference formulation with 1.2% filler and 0.5% kaolinite

| | 5° C. | 10° C. | 15° C. | 20° C. | 25° C. | 35° C. |
|---|---|---|---|---|---|---|
| Standing for 12 h | −18.3% | −20.06% | −13.5% | −19.08% | — | −32.1% |
| After returning to 20° C. | −15.0% | −26.2% | −19.5% | — | — | 28.1% |

Example 9 Comparative

Absence of Salt

By way of comparison, aqueous polysaccharide suspensions were tested in the absence of $K_2CO_3$ salt with the same polysaccharides and under the same conditions as for example 6. It proved to be impossible, for all the polysaccharides, to produce an aqueous suspension due to the formation, in all cases, of large amounts of floc.

Example 10

Water Retention Agent for a Cementitious Composition

A—Method for Measuring the Water Retention

A specific measurement method was developed to measure the ability of a mortar to retain water when it is in contact with an absorbent medium.

The water-retaining power of the mortar is evaluated using vacuum filtration. The protocol is as follows:

a. preparation of the mortar: the initial fraction by weight of water in each mortar composition is expressed by $f_{water}$= (weight of mixing water)/(total weight of the mortar).

b. a defined weight of mortar $w_{mortar}$ is placed on a filter paper of a vacuum funnel of Büchner type; the mortar inside the funnel thus includes a weight of water equal to $W=w_{mortar} \cdot f_{water}$.

c. the Büchner funnel is placed on a vacuum flask connected to a membrane pump with the imposition of a vacuum of 200 mbar for 3 minutes, making possible the extraction of a portion of the water present in the mortar.

d. weighing of the vacuum flask after the extraction subsequently makes it possible to determine the weight of water extracted by filtration w.

The water retention, R, of a mortar is then defined as $R=(W-w/W) \times 100$, with:

R: water retention, as percentage;

W: weight of water in the mortar before filtration ($W=w_{mortar} \cdot f_{water}$), in grams;

w: liquid weight recovered after the filtration, in grams.

The accuracy of the measurement is estimated at 5% (relative uncertainty).

B—Measurement of the Spreading

In addition to the water retention, it is normal to also evaluate the spreading (S, millimeters) of the mortar. This conventional measurement (measured according to the CEM* protocol developed by CTG) consists in filling a mold of frustoconical shape with the mortar which it is desired to characterize. The mold is subsequently raised and the diameter of its impression is taken as spreading value of the mortar.

C—Adjuvant in Cementitious Composition in the Mortar Form

The object to be achieved was in this case that of improving the water retention capacity without affecting the spreading of the mortar.

The adjuvant according to the invention which was tested is in the form of a stable aqueous polysaccharide suspension presented in example 3 and hereinafter referred to as RETEXP, and was compared with a commercial water retention agent (BASF, Starsolite).

The tests were carried out on a cement grout composed of:
680 g of cement,
1350 g of CEM* sand,
303 g of water,
8.16 g of superplasticizer (Cimfluid Adagio 4019), i.e. 1.2% of the weight of cement (*La méthode du mortier de béton équivalent (MBE). Un nouvel outil d'aide àla formulation des bétons adjuvantés [The concrete equivalent mortar (CEM) method. A new tool for helping in the formulation of adjuvant-comprising concretes]. A. Schwatzentruber and C. Catherine, Materials and Structures, Vol. 33, October 2000, pp. 475-482)

In addition to the two adjuvants mentioned above, some components of the aqueous RETEXP suspension, namely hydroxyethylcellulose HEC, $K_2CO_3$ salt and attapulgite, were tested in amounts equal to those of their presence in the RETEXP adjuvant. The results are combined in table 16.

TABLE 16

Measurement of the spreading and of the water retention

| Adjuvant | % by weight with respect to the cement | Spreading (mm) | Water retention (%) |
|---|---|---|---|
| None | — | 345 | 64 |
| BASF Starsolite (powder) | 0.35 | 340 | 85 |
| RETEXP (liquid) (ex. 3) | 0.35 | 363 | 84 |
| HEC (powder) | 0.075 | 362 | 83 |
| $K_2CO_3$ (powder) | 0.065 | 340 | 65 |
| Attapulgite (powder) | 0.0018 | 345 | 64 |

It is found that the addition of the water retention adjuvant according to the invention RETEXP makes it possible to obtain water retentions of the same order of magnitude as those of the BASF commercial product but with the advantage of superior spreading to that of the latter and to that of the adjuvant-free reference.

The adjuvant (RETEXP) according to the present invention exhibits the enormous advantage of being introduced in the liquid form, which thus makes possible easy metering and easy dispersion in the cementitious composition.

In addition, if the spreading values are examined, $K_2CO_3$ alone and attapulgite alone do not influence the spreading. They are thus not the source of the properties observed; it is thus clearly the presence of the polysaccharide which makes possible the surprising increase in the spreading, despite an increased water retention.

Example 11

Spreading and Viscosity of Self-Compacting Concrete

It has also been found that the aqueous suspension according to the invention RETEXP makes it possible to confer, on a cementitious composition of self-compacting concrete type, appropriate properties both of spreading but also of viscosity and of passing ability, and also resistance to segregation.

To this end, a concrete composition as presented in table 17 was employed with different adjuvants:
either without adjuvants other than the superplasticizer: reference concrete with filler,
or in the presence both of a viscosifying agent and of a thresholding agent, that is to say a concrete without filler (column 2), in accordance with the patent application FR 07/05568 of the same Applicant,
or with a concrete without filler with a reduced volume of grout with only just a viscosifying agent,
or with a concrete without filler with only the liquid adjuvant RETEXP (right-hand column) according to the present invention, with in addition a reduced volume of cement grout.

The following parameters were measured:
the spreading according to the standard NF EN 12350-2 at different time intervals counting from the mixing $t_0$ up to $t_{120\ min}$;
the V-funnel test at $t_0$ and $t_{60\ min}$, which makes it possible both to test the viscosity and the filling ability of a self-compacting concrete. A V-shaped funnel is filled with fresh concrete and the time (in seconds) necessary for the concrete to flow out of this funnel is measured. The value obtained measures the flow time of the V-funnel. This test is described in detail in the document *The European Guidelines for Self Compacting Concrete* (May 2005, Self Compacting Concrete European Project Group—S.C.C.E.P.G.);
the L-box test (described in the same document), which consists in allowing a measured volume of fresh concrete to flow horizontally through spaces made between vertical bars. The concrete is introduced into the vertical part of the L-shaped box and flows into the horizontal part, and the height flowed in this part at the end of the horizontal branch of the L of the box is measured. The measurement presented in table 17 expresses the passing ability and is equal to the ratio of the height of the concrete at the end of the horizontal part of the box to the height of the concrete remaining in the vertical portion of the box;
the sieve stability (measurement method presented in the same document); the result indicates the percentage of concrete passing through a sieve during a given time;
the compressive strength is measured at 7 days and at 28 days.

The results presented in table 17 show that the self-compacting concrete formulation with the RETEXP adjuvant exhibits, with a reduced volume of grout, better spreading from t=30 min up to t=120 min and a better sieve stability, with respect to the formulation with 110 kg/m³ of filler which exhibits a "supercompressive strength" at 28 days.

TABLE 17

| Constituents (kg/m³) (% weight/cement) | Reference concrete with filler | Concrete without filler $V_g = 370$ l | Concrete without filler at $V_g = 350$ l | Concrete without filler at $V_g = 350$ l liquid adjuvant |
|---|---|---|---|---|
| Cement | 320 | 372 | 350 | 350 |
| Effective water | 200 | 227 | 213 | 213 |
| Filler | 110 | 0 | 0 | 0 |
| Sand (0/4 mm) | 876 | 876 | 904 | 904 |

TABLE 17-continued

| Constituents (kg/m$^3$) (% weight/cement) | Reference concrete with filler | Concrete without filler $V_g$ = 370 l | Concrete without filler at $V_g$ = 350 l | Concrete without filler at $V_g$ = 350 l liquid adjuvant |
|---|---|---|---|---|
| Gravel (4/14 mm) | 709 | 709 | 732 | 732 |
| Superplasticizer | 3.13 (0.95%) | 2.70 (0.73%) | 3.01 (0.86%) | 3.01 (0.86%) |
| "Viscosifying" agent* | 0 | 0.84 (0.225%) | 0.63 (0.18%) | 3.15 (liq.) 0.9% |
| "Thresholding" agent** | 0 | 0.093 (0.025%) | | |
| Volume of grout | 370 l | 370 l | 350 l | 350 l |
| Spreading | | | | |
| At t$_0$ | 665 mm | 665 mm | 610 mm | 600 mm |
| At t$_{30\ min}$ | 650 mm | 650 mm | 670 mm | 680 mm |
| At t$_{45\ min}$ | 605 mm | — | — | — |
| At t$_{60\ min}$ | 595 mm | 690 mm | 680 mm | 660 mm |
| At t$_{90\ min}$ | — | 685 mm | 660 mm | 650 mm |
| At t$_{120\ min}$ | 410 mm | 680 mm | 630 mm | 600 mm |
| V-funnel at t$_0$ | 3.6 s | 2.8 s | 2.6 s | 3.2 s |
| V-funnel at t$_{60\ min}$ | — | — | 3.3 s (t$_{120}$) | 2.9 s |
| L-box | 0.9 | 0.89 | 0.9 | 0.89 |
| Sieve stability | 17% | 16% | 6% | 8% |
| Compressive strength | | | | |
| 7 days | 34.5 MPa | 22.3 MPa | 24.3 MPa | 30.5 MPa |
| 28 days | 41.2 MPa | 33.5 MPa | 35.8 MPa | 36.7 MPa |

*The "viscosifying" agent is Natrosol 250 GXR (HEC)
**The "thresholding" agent is Esacol MX 144 (hydroxypropyl guar)

The invention claimed is:

1. A water retention agent for a cementitious composition, comprising a liquid aqueous suspension of:
   at least one polysaccharide at a concentration by weight of between 15% and 30%,
   in an aqueous solution of a strong base salt, with the exception of ammonium salts, having an ionic strength of between 1.25 mol/l and 15 mol/l, and a pH of greater than 9,
   micronized attapulgite, and
   filler comprising at least one nonphyllitic mineral powder, the content by weight of said filler being between 0.1% and 5% of said aqueous suspension,
   wherein the micronized attapulgite and filler are chemically inert in said aqueous suspension, have a particle size of between 0.1 and 100 micrometers, and confer stability on said aqueous suspension within a temperature range of at least 5° C. to 30° C.

2. The water retention agent as claimed in claim 1, wherein the content by weight of attapulgite in the aqueous suspension is between 0.1% and 5%.

3. The water retention agent as claimed in claim 1, wherein the aqueous solution exhibits an ionic strength of between 2.5 mol/l and 12.5 mol/l.

4. The water retention agent as claimed in claim 1, wherein the filler is a siliceous filler, with a density of between 2.60 and 2.80 g/ml.

5. The water retention agent as claimed in claim 1, wherein the filler exhibits a particle size curve having a D50 value between 1 μm and 12 μm.

6. The water retention agent as claimed in claim 1, wherein the concentration by weight of the polysaccharide(s) is between 18% and 25% of said aqueous suspension.

7. The water retention agent as claimed in claim 1, wherein the at least one polysaccharide exhibits, dry, a particle size curve having a D50 value between 10 μm and 200 μm.

8. The water retention agent as claimed in claim 1, wherein the at least one polysaccharide is a hydroxyalkylcellulose or a hydroxyalkyl guar comprising a $C_2$ to $C_8$ alkyl group, or a mixture thereof.

9. The water retention agent as claimed in claim 8, wherein the hydroxyalkylcellulose is a hydroxyethylcellulose (HEC), a methylhydroxypropylcellulose (MHPC), a hydrophobic modified hydroxyethylcellulose (HMHEC), or a mixture thereof.

10. A process for increasing the viscosity of a cementitious composition and its ability to retain water, comprising adding the water retention agent as claimed in claim 1 to the cementitious composition.

11. The process as claimed in claim 10, wherein the addition of the water retention agent does not affect the spreading of the cementitious composition.

12. A cementitious composition based on cement and water, comprising the water retention agent as claimed in claim 1 in an amount of between 0.1% and 5% by weight of the cement.

13. The water retention agent as claimed in claim 1, wherein the content by weight of attapulgite in the aqueous suspension is between 0.2% and 0.8%.

14. The water retention agent as claimed in claim 4, wherein the filler is a crystalline siliceous filler.

15. The water retention agent as claimed in claim 1, wherein the filler exhibits a particle size curve having a D50 value between 2 μm and 8 μm.

16. The water retention agent as claimed in claim 1, wherein the content by weight of filler is between 0.35% and 1.5% of said aqueous suspension.

17. The water retention agent as claimed in claim 1, wherein the at least one polysaccharide exhibits, dry, a particle size curve having a D50 value between 50 μm and 150 μm.

* * * * *